United States Patent [19]

Wolford et al.

[11] Patent Number: 4,723,630
[45] Date of Patent: Feb. 9, 1988

[54] TREE STAND WITH ADJUSTABLE FOOT REST

[76] Inventors: Denver C. Wolford, Rte. 1, Box 235A, Matthews, Mo. 63867; Marvin A. Wolverton, Rte. 2, Box 844, Sikeston, Mo. 63801

[21] Appl. No.: 95,041

[22] Filed: Sep. 9, 1987

[51] Int. Cl.[4] .................. A01M 31/02; A47C 9/10; A45F 3/26
[52] U.S. Cl. .................. 182/134; 182/187; 108/152
[58] Field of Search ............. 182/187, 188, 134, 135, 182/133; 108/152

[56] References Cited

U.S. PATENT DOCUMENTS

| | | | |
|---|---|---|---|
| 3,460,649 | 8/1969 | Baker | 182/187 |
| 4,230,203 | 10/1980 | Sweat | 182/134 |
| 4,316,526 | 2/1982 | Amacker | 182/187 |
| 4,369,858 | 1/1983 | Babb | 182/187 |
| 4,411,335 | 10/1983 | Forrester | 182/187 |
| 4,474,265 | 10/1984 | Shinkle | 182/187 |
| 4,553,634 | 11/1985 | Roberts | 182/134 |
| 4,589,522 | 5/1986 | Shelton | 182/187 |
| 4,593,789 | 6/1986 | Treats | 182/187 |
| 4,595,079 | 6/1986 | Shope | 182/134 |

Primary Examiner—Reinaldo P. Machado
Attorney, Agent, or Firm—Glenn K. Robbins

[57] ABSTRACT

An integrated tree climbing apparatus. The apparatus is in the form of a chair stand comprised of a seat rest and an adjustable foot rest. The two rests are connected to each other in a hinged relationship by supporting arms which extend past and straddle the tree and are engagable with a V-shaped knife clamp to effect a gripping action. The supporting arms are diagonally mounted on the side of the seat and a leg of the foot rest and are angled upward to accommodate the tree. The hinged aspect of the foot rest allows it to be moved to various angles according to the needs of the user. A V-brace is incorporated into the seat rest to complete the clamping structure. The rear V-shaped knife clamp is sheathed on its ends to slide on the supporting arms. Quick-connect linchpins are employed for simplicity and economy. Due to the hinging and pivotal connections of the members, the apparatus easily folds down into a compact unit as a simulated backpack frame for easy portability.

10 Claims, 8 Drawing Figures

TREE STAND WITH ADJUSTABLE FOOT REST

BACKGROUND OF THE INVENTION

There is the need in deer hunting and the like to place one's self above the ground in order to command a superior field of vision of the hunting area and to keep out the deer's line of sight. Therefore, tree stands are a preferred method of hunting for deer. Building an ordinary stand takes a considerable amount of time and effort. Once the stand is built it is more or less permanent. Although suitable for the instant purpose, it soon becomes impractical. The building materials are subject to deterioration; the deer population in the immediate area may decrease necessitating a relocation of the stand; also, a permanent stand might attract other hunters to one's favorite spot.

There has accordingly long been a need to develop a prefabricated tree stand which may quickly and efficiently be placed in and removed from the tree. While some chair stands have been developed, there has remained the need for a compact, integrated unit which features easy manipulation, lightweight construction, portability and versatility in other uses.

SUMMARY OF THE INVENTION

By mean of the instant invention there has been provided an apparatus encompassing the various characteristics of a tree-climbing chair stand, including a seat and foot rest hinged together to form an integral unit.

The chair stand is comprised of metal tubing, such as steel, aluminum or the like, and expanded metal which are hinged together to form a seat platform, a foot rest and an adjustable set of V-braces to be secured to the tree.

The chair stand is suspended alongside the tree by its own weight through the use of the V-braces. One brace is built into the seat which presses horizontally against the tree while the other brace which is attached to arms extending from the stand, presses at an angle downwardly against the back of the tree. The seat, foot rest and adjustment arms are connected in a hinging relation.

Foot straps are employed to secure the user's feet to the seat from which the unit is lifted. The user stands on the seat facing the tree; while firmly grasping the tree the user bends his knees so as to slide the stand up the tree. When the stand has re-gripped the tree the user straightens himself to a standing position. The user repeats this process as many times as necessary to get the stand to the desired height. The user then releases his feet from the strap and steps down to the foot rest and may now turn to sit down.

To lower the stand, the user again steps up to the seat and secures his feet with the straps. The user bends his knees and firmly hugs the tree. The chair stand is loosened from the tree by slightly pulling the heels up and pointing the toes down to release the clamping engagement. The stand is then lowered by the user. The stand will regrip the tree as the user applies weight to his heels. The process is repeated until the stand is lowered to the ground.

The chair stand has extended arms on both sides providing space for the tree. A removable V-brace slides on to the extended arms and is secured by quick release linchpins thus enclosing the tree. The arms are provided with evenly spaced holes to allow the rear V-brace to be adjusted according to the size of the tree. The chair stand can accommodate trees approximately four inches to fourteen inches in diameter. Both V-shaped braces are constructed so as to function a knife edges to enable them to grip into the tree surface much in the manner of a slide lock.

The foot rest is constructed in a integral rigid L-shaped form with vertical legs fixed to the foot rest portion. The top portion of the vertical legs are pivotally connected to the seat rest and may be adjusted to varying positions of tilted adjustment on either side of a vertical relation as desired. Adjustment is effected by pinning the support arm which is pivoted medially at the seat rest to different adjustment positions on the vertical legs. Adjustment and strong bracing for weight support on the chair stand whether the user is standing on the seat rest or the foot rest is thereby provided.

A further feature of the invention resides in the knock-down foldability of the chair stand when being transported or stored. The stand may be carried over the shoulders by appropriate rubber straps or the like to rest against the back. The L-shaped form of the foot rest provides a ledge or shelf-like support by the foot rest which may be used to support a load or the like as desired.

The chair stand is composed of metal tubing and expanded metal of relatively light weight and small size. It is an integral unit, easily folded down to a compact size. The stand is easily portable and can be supported over the shoulders like a back pack. Its rugged, sturdy and durable construction gives it versatility so it can even be used as a seat around the camp.

The above features are objects of this invention. Further objects will appear in the detailed description which follows and will be further apparent to those skilled in the art.

For the purpose of illustration of this invention, a preferred embodiment thereof is shown in the accompanying drawing. It is to be understood that the drawing is for purpose of description only and that the invention is not limited thereto.

IN THE DRAWING

FIG. 1 a pictorial view from the left side showing the chair stand as it rests on the tree;

DESCRIPTION OF THE INVENTION

Figure 1:
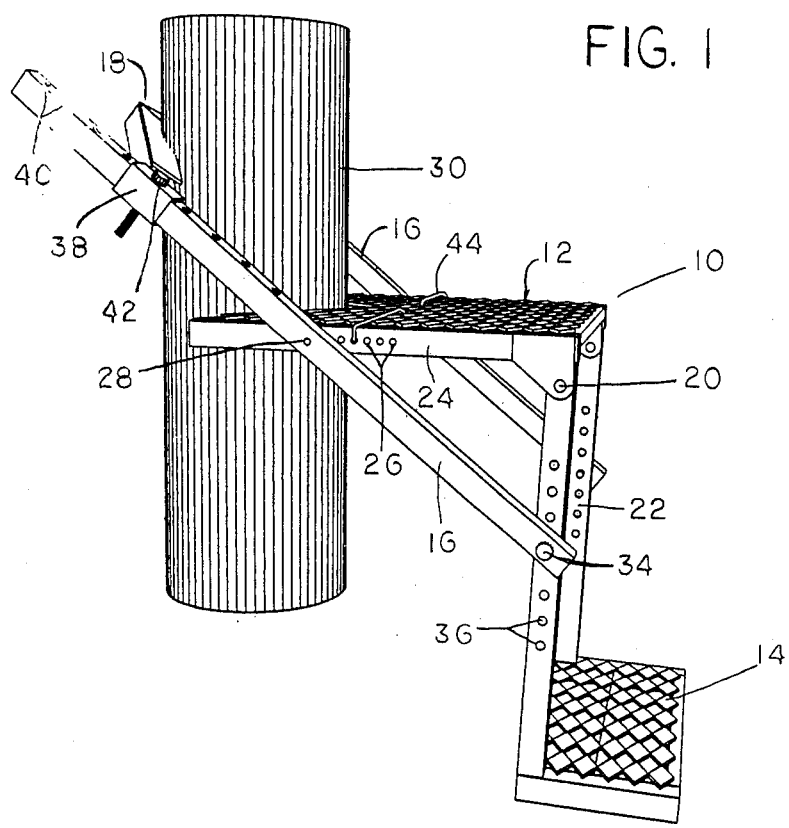

The tree-climbing chair stand of this invention is generally indicated by the reference numeral 10 in FIGS. 1 through 8. It is comprised of a seat portion 12, foot rest 14, adjustment and support arms 16 and V-shaped knife brace 18.

The chair stand is constructed of square metal tubing. The seat portion 12 and foot rest 14, are comprised of a metal open-mesh grate of metal, such as steel, aluminum or the like, for lightweight and to allow boot debris to fall through and to prevent noise from moving around in the stand.

Figure 2:
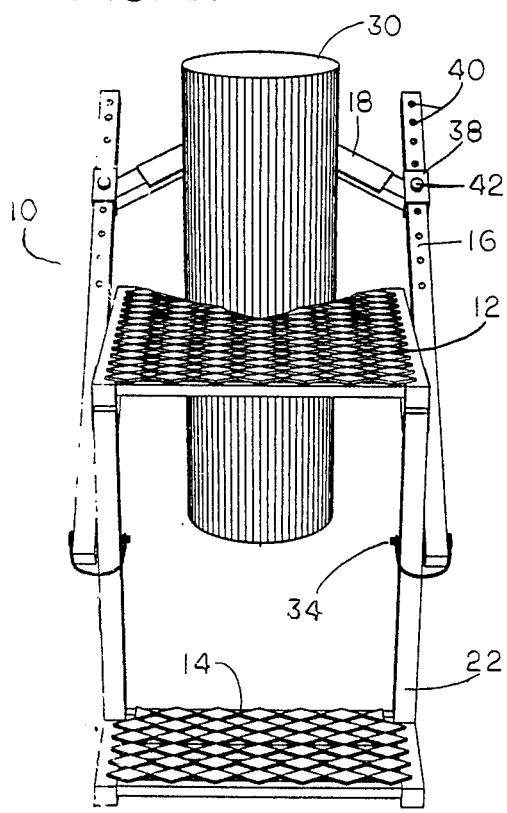
FIG. 2 is a pictorial view from the front showing the chair stand as it rests on the tree.
Figure 3:
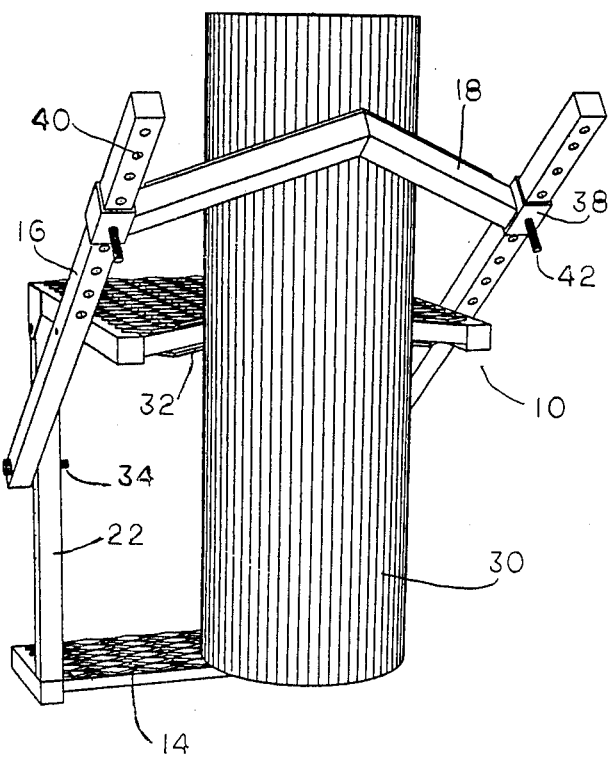
FIG. 3 is a pictorial view from the rear showing the chair stand as it rests on the tree.

As shown in FIGS. 1 through 3, 6 and 7, the stand is readily collapsible for easy portability much like a back pack. The seat portion 12 is attached to the foot rest element 14 in a hinging relationship as best shown in FIGS. 1 through 3.

The foot rest 14 is supported by vertical legs 22 to which it is rigidly connected in an L-shaped configuration. The top of the vertical legs are hinged by pivots 20 to the forward portion of the seat rest.

Figure 7:
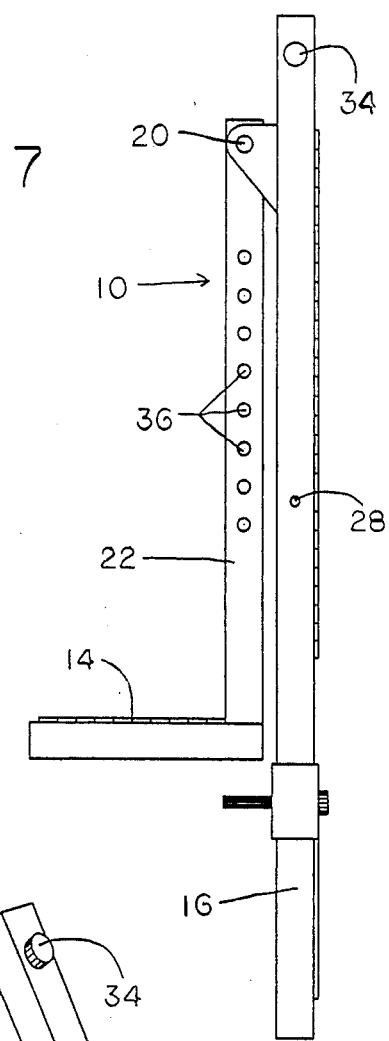
FIG. 7 is a view in right side elevation of the chair stand in its completely folded state.
Figure 8:
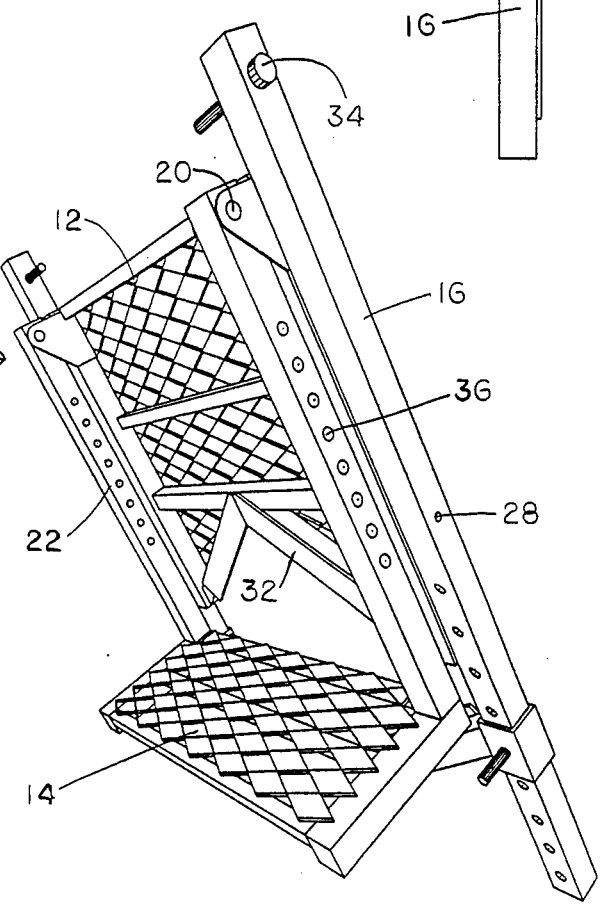
FIG. 8 is a pictorial view of the right side of the chair stand in its completely folded state.

The seat portion 12 has lateral sides 24, shown in FIG. 1, which are equipped with a series of holes 26 to accommodate the adjustment of foot straps 44. The adjustment arms 16 are attached to seat portion 12 in a pivoting relationship by pivot pins 28. The foot rest, seat portion and adjustment and support arms fold together in a parallel relationship resulting in a configuration much like a back pack frame as best shown in FIGS. 7 and 8.

The chair stand is suspended on a tree 30 during use as shown in FIGS. 1 through 5. This is effected through the gripping action of the V-shaped knife brace 18 and the built-in V-shaped knife brace 32 at the rear of seat portion 12. The stand is secured to the tree when downward pressure is applied on the seat portion or foot rest, as when the user is sitting or standing on it.

In preparation of use of the chair stand, the foot rest 14 and chair portion 12 are opened out so that the flat areas are parallel to each other. The adjustment arm 16 is then pivoted along its point of attachment at 28 on the lateral side of the seat 24. The adjustment arms are equipped with a quick-release linchpin 34 which fits in a hole at the end of the arm for attachment to the legs 22 of the foot rest. The attachment is made in one of the holes 36 in the leg 22 as best shown in FIG. 1.

The adjustment arms protrude up at an angle on either side of the tree when the chair tand 10 is placed against the tree. The V-shaped knife brace or clamp 18 is a separate element slidable upon the adjustment and support arm 16. It is equipped on either end with a sleeve 38 which fits in sliding relation over the adjustment arms, enclosing the tree 30 as best shown in FIGS. 1 through 3. The adjustment arms are equipped with a series of adjustment holes 40. The sleeve 38 is provided with a hole and linchpin 42 to secure the knife clamp 18 on the adjustment arms in a selected position to accommodate the tree trunk. By providing a series of spaced holes 40 the knife clamp 18 can be adjusted so that the chair stand may fit various size trees from approximately four inches to fourteen inches in diameter.

Figure 4:
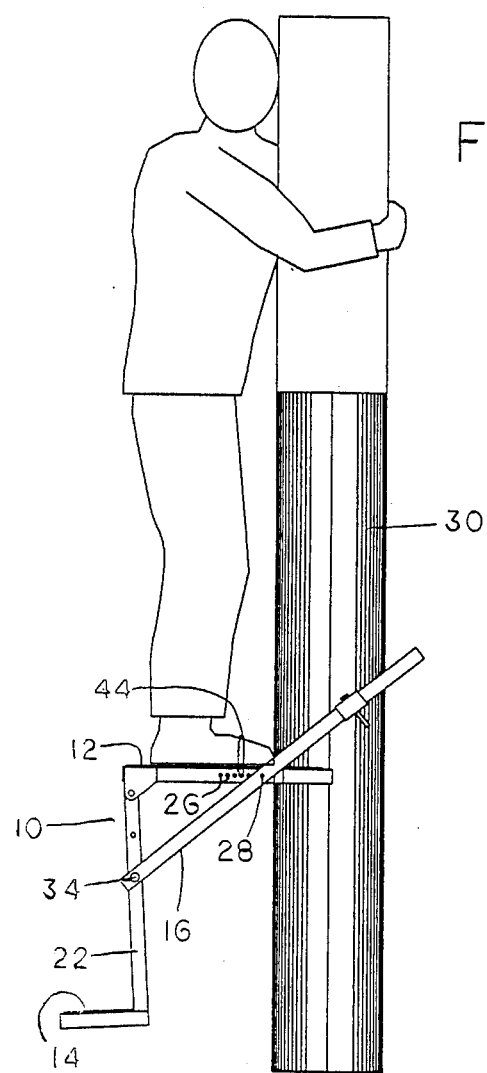
FIG. 4 is a view in side elevation of a user, legs extended, in the process of ascending or descending the tree with the chair stand.
Figure 5:
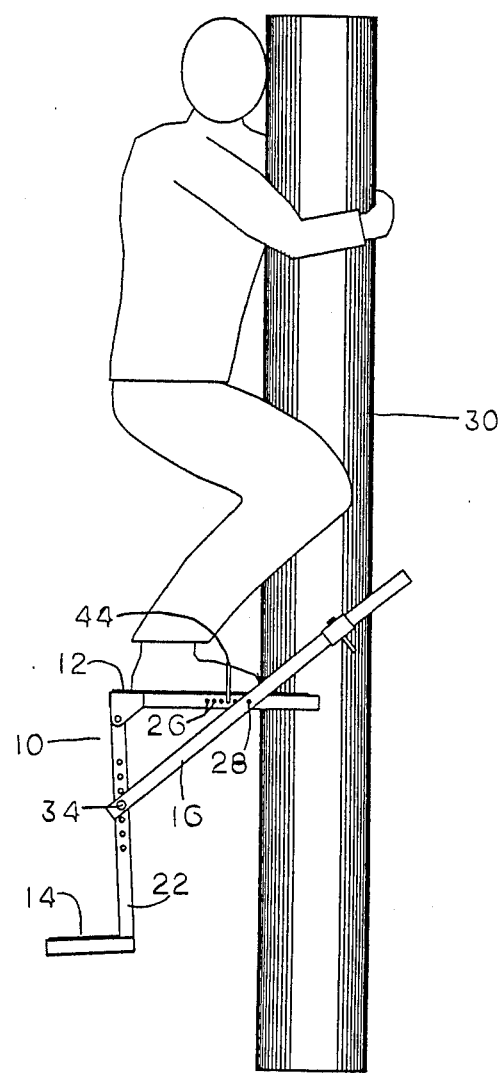
FIG. 5 is a view like FIG. 4, showing a user, legs bent, in the process of ascending or descending the tree.

Climbing is effected through stages by lifting the chair through the use of foot loops 44 provided on the seat 12. After securing the chair stand to the tree the user steps up on the seat portion 12 as shown in FIG. 4. The seat is equipped with hooked straps 44 which act as foot loops and may be fastened to one of the holes 26 provided on the side of seat portion. Conventional rubber straps with S-hooks at the end may be utilized as will be readily understood.

USE

The tree-climbing chair stand is very simply employed on almost any tree in any location. The tree must be relatively branchless up to the height desired for hunting.

Upon selection of the tree, the chair stand is unfolded from its collapsed state shown in FIGS. 7 and 8. The seat portion 12 and the foot rest 14 are pulled apart as shown in the intermediate stag of FIG. 6 and to the full erection position of FIGS. 1 through 3. The adjustment arm 16 is pivoted about its pivot pin 28 until the hole 35 and linchpin 34 are lined up and registered with one of the adjustment holes 36 on the foot rest leg 22. By employing the quick-release linchpin 34 in the various different holes 36 the angle between the foot rest leg 22 and seat portion 12 may be increased or decreased. The angle chosen will vary according to the comfort of the user.

The V-shaped knife clamp 18 must next be removed to allow the adjustment and support arms 16 to straddle the tree. As the chair stand is positioned on the tree so that the seat is parallel to the ground and the V-shaped knife brace 32 is against the tree, the knife clamp 18 is replaced back on the adjustment arms. The sleeves 38 of the clamp are equipped with a hole and quick-connect linchpin 42 which are registrable in any one of a series of holes 40 on the support arm to allow the clamp 18 to be closed to a loose fit around the tree. The adjustable sliding knife clamp allows the chair stand to accommodate various size trees from approximately four to fourteen inches in diameter.

The chair stand is suspended on the tree by the combined gripping actions of the V-shaped brace knife 18 and the seat rest knife brace 32. Any downward weight applied to the stand puts pressure on the knife clamps causing them to lock and dig into the tree.

In raising the chair stand to the desired height, the user first steps upon the seat portion 12 as shown in FIG. 4. The foot straps 44 are equipped with S-hooks for attachment to a hole 26 at the sides of the seat rest as shown in FIGS. 1 and 4. The user places his feet under the secured straps, making sure of a snug fit. To begin climbing, the user stands normally and grasps the tree in a firm bear hug ("hand climbers" for grasping the tree may also be desirable.) Then he merely raises his knees and points his toes down whereby the knife clamps will become disengaged from the tree and the chair stand is raised a foot or two.

The user then points his toes upward and applies weight to the seat. The clamp knives 18 and 32 will be re-secured to the tree and the user may then stand straight up. He may repeat this process as many times as necessary to get to the desired height. When he reaches the desired height, he merely removes his feet from the straps and steps down from the seat portion on to the foot rest 14. The user may now sit down and rest upon the stand for any desired activity. This may be performed from the sitting position or by standing on either the foot rest or seat rest.

To lower the chair stand, the user employs essentially the reverse steps. He steps back up to the seat 12 and secures his feet under the straps 44. He then bends his knees before grasping the tree. When he has attained a firm grip, he raises his heels and points his toes downward. This will disengage the knife clamps 18 and 32 from the tree which will loosen the chair stand. The user then extends his legs down thus lowering the stand. When his legs are fully extended he must drop his heels and raise his toes which will cause the knife clamps to re-engage. The process is repeated a many times as is necessary to completely lower the chair stand.

To remove the chair stand from the tree one only need disengage the linchpin 42 of the V-shaped knife clamp. The clamp 18 may then be removed from the adjustment arms 16. This leaves the chair stand free to be pulled away from the tree.

Figure 6:
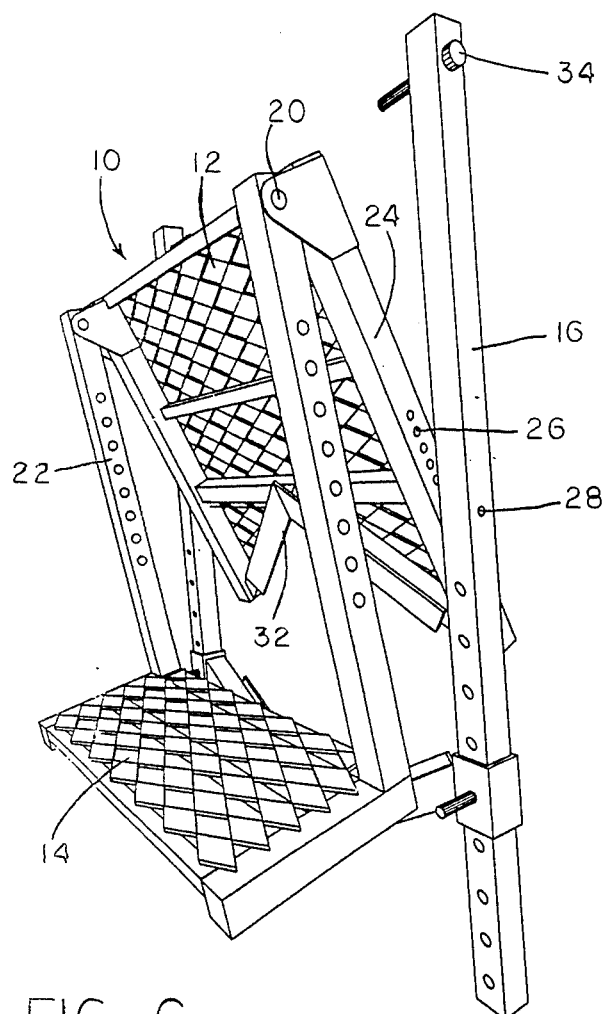
FIG. 6 is a pictorial view from the right side showing the chair stand partially broken down.

The chair stand may be efficiently folded down to a compact size for convenient portability. The clamp 18 is reconnected to the ends of the adjustment arms while the lower ends of the arms 16 are disconnected from the support legs 22 of the foot rest. Breakdown is made easy by the use of quick-release linchpins 34. The seat portion 12 is folded back on the foot rest 14 by pivoting about the hinge connection 20. Finally, the adjustment arm 16 is brought into parallel alignment with the closed foot rest legs 22 and seat portion 24 by pivoting about pivot pin connection 28 as shown in FIGS. 6, 7 and 8. The knife brace is then replaced on the arms 16.

In the folded or knocked down position of FIGS. 7 and 8 the chair stand is easily transported and stored. It may also be used as a back pack for transporting. Thus, by supplying shoulder straps and hooking shoulder straps with S-hooks at the end (not shown) which may be hooked in appropriate holes 36 of the foot rest legs 22 or the holes 40 of the adjustment and support arms 16, shoulder loops may be easily provided for back pack transport. The foot rest 14 extending to the rear may be employed for loading the back pack.

While the invention has been described in relation to climbing of trees, it will be apparent that it may also be employed on poles, such as utility poles and the like. In such wide employment, it may be utilized by utility workers, photographers or anyone desiring a stable seat stand that is rugged and simply employed.

Various changes and modifications may be made within this invention as will be apparent to those skilled in the art. Such changes and modifications are within the scope and teaching of this invention as defined in the claims appended hereto.

What is claimed is:

1. A chair stand for climbing trees or the like, said chair stand comprising a seat rest member and a foot rest member, said foot rest being rigidly connected to a pair of support legs, said support legs being pivotally connected to said seat rest member, and clamping means for clamping said chair stand to a trunk of said tree, said clamping means comprising an adjustable knife brace adapted to engage a rear surface of said trunk, said knife brace being adjustably supported upon a pair of adjustable support arms, said support arms being connected in supporting relation to both said seat rest member and said support legs of the foot rest member, said clamping means further comprising a seat rest brace member adapted to engage a front surface of said trunk and being connected to a rear part of said seat rest member, and said seat rest member being provided with foot receiving elements enabling a user to tilt said chair stand to disengage said clamping means from locking relation with the tree and by supporting his weight upon the trunk of the tree to raise and lower said chair stand in successive stages.

2. The chair stand of claim 1 in which said foot rest member is connected to said support legs in a rigid substantially L-shaped position and said support legs are connected to said support arms in selected positions of adjustment to vary the positional relationship of said foot rest member with respect to said seat rest member.

3. The chair stand of claim 2 in which the adjustable knife brace is supported at opposite ends upon sleeve members and are slidably adjustable on said support arms to space said adjustable knife brace from the seat member in different positions of adjustment to accommodate tree trunks of different sizes.

4. The chair stand of claim 3 in which said sleeves are provided with holes registrable with size adjustment holes in said support arms and are lockable thereon by quick-release linchpins fitting through said registrable holes.

5. The chair stand of claim 2 in which said support legs are provided with a series of angle adjustment holes spaced thereon from one another, said support arms are each provided with a hole at an end portion of said arms, said holes in the support arms being registrable selectively with said angle adjustment holes and receiving quick-release linchpins therethrough for locking engagement for locking said foot rest in selected positions of angular adjustment to said seat rest.

6. The chair stand of claim 1 in which said support arms are pivotally fixed at a medial position to opposite sides of said seat rest member and are moveable in a collapsed position to a parallel relationship with said seat rest member, said legs being pivotable in said collapsed position to a substantially flush relationship against said seat rest member and said adjustable knife brace in the collapsed position of the chair stand is supported upon the support arms substantially in line and coextensive with the seat rest member to provide a substantially tight flattened and compact relationship.

7. The chair stand of claim 6 in which the chair stand is receivable against the back of a user as a back pack and the foot rest member extends substantially perpendicular to the flattened and compact chair stand and away from the back of the user in the manner of a load supporting shelf.

8. The chair stand of claim 3 in which said support legs are provided with a series of angle adjustment holes spaced thereon from one another, said support arms are each provided with a hole at an end portion of said arms, said holes in the support arms being registrable selectively with said angle adjustment holes and receiving quick-release linchpins therethrough for locking engagement for locking said foot rest in selected positions of angular adjustment to said seat rest.

9. The chair stand of claim 3 in which said sleeve members are provided with holes registrable with size adjustment holes in said support arms and are lockable thereon by quick-release linchpins fitting through said registrable holes and said support legs are provided with a series of angle adjustment holes spaced thereon from one another, said support arms are each provided with a hole at an end portion of said arms, said holes in the support arms being registrable selectively with said angle adjustment holes and receiving quick-release linchpins therethrough for locking engagement for locking said foot rest in selected positions of angular adjustment to said seat rest.

10. The chair stand of claim 1 in which said foot rest member is connected to said support legs in a rigid substantially L-shaped position and said support legs are connected to said support arm in selected positions of adjustment to vary the positional relationship of said foot rest member with respect to said seat rest member and the adjustable knife brace is supported at opposite ends upon sleeve members and are slidably adjustable on said support arms to space said adjustable knife brace from the seat member in different positions of adjustment to accommodate tree trunks of different sizes, said support legs are provided with a series of angle adjustment holes spaced thereon from one another, said support arms are each provided with a hole at an end portion of said arms, said holes in the support arms being registrable selectively with said angle adjustment holes and receiving quick-release linchpins therethrough for locking engagement for locking said foot rest in selected positions of angular adjustment to said seat rest, said support arms are pivotally fixed at a medial position to opposite sides of said seat rest member and are moveable in a collapsed position to a parallel relationship with said seat rest member, said legs being pivotable in said collapsed position to a substantially flush relationship against said seat rest member and said adjustable knife brace in the collapsed position of the chair stand is supported upon the support arms substantially in line and coextensive with the seat rest member to provide a substantially tight flattened and compact relationship.

* * * * *